Sept. 8, 1925.

O. R. BRINEY

SEALING MEANS FOR PACKING RINGS

Filed Sept. 10, 1924

1,552,674

INVENTOR
Ottis R. Briney
BY
C.F.Hinkel.
ATTORNEY

Patented Sept. 8, 1925.

1,552,674

UNITED STATES PATENT OFFICE.

OTTIS R. BRINEY, OF PONTIAC, MICHIGAN.

SEALING MEANS FOR PACKING RINGS.

Application filed September 10, 1924. Serial No. 736,836.

*To all whom it may concern:*

Be it known that I, OTTIS R. BRINEY, a citizen of the United States, residing in Pontiac, county of Oakland, and State of Michigan, have invented a new and useful Improvement in Sealing Means for Packing Rings, of which the following is a specification.

My invention relates to means for forcing a pair of packing rings apart laterally.

The main object of my invention is a simple and inexpensive means for forcing a pair of packing rings apart or away from each other and upon their lateral seats; which means is unresilient laterally and helps the radial expansive function of the packing rings; which can be made of material other than the material of the cylinder in which the packing rings operate; and which can be applied to existing pistons or other packing boxes and packing rings by cutting away that portion of the piston which is disposed between two adjacent ring grooves and insert the present sealing means into this new space. Other objects will become apparent during the description of the mechanisms shown in the accompanying drawing.

In packing rings it is quite desirable that they rest firmly and unyieldingly on their lateral seats to prevent leakage but should not be forced upon their seats sufficiently tight to interfere with the radial expansion thereof.

Various devices have been made comprising spring means to force the rings upon their seats but such means, although an improvement over older devices, are not quite satisfactory because the spring means is resilient and yields under the friction occurring between the circumferential surface of the rings and the cylinder bore and thereby removes the rings from their seats. If the spring means is made sufficiently strong to prevent such removal, the rings are prevented from expanding radially and thereby prevent a proper seal either at the lateral seats or on the circumferential faces or at both of these places.

The present invention aims to provide a sealing means between a pair of packing rings which attains the above advantages and overcomes the above disadvantages.

I attain the above objects and advantages by the mechanisms illustrated in the accompanying drawing which shows certain constructions and arrangements of parts embodying the features of my invention and in which.

Similar reference characters refer to similar parts throughout the views.

Figure 1:
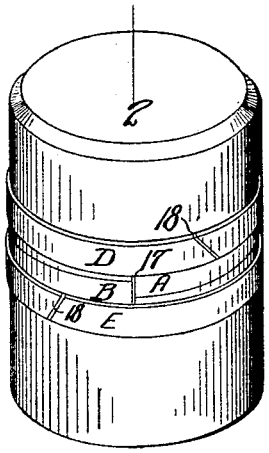
Fig. 1 is a perspective view of a piston with two ordinary parallel sided piston rings and a sealing means of the present invention interposed between these two rings.
Figure 2:
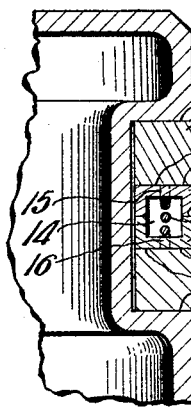
Fig. 2 is a longitudinal section of a portion of Fig. 1, on a larger scale, taken on a vertical plane indicated by the line 2 in Fig. 1, sectionally showing a pair of parallel sided packing rings and the structure of the expander parts and the relations thereof to each other and to the packing rings.
Figure 4:
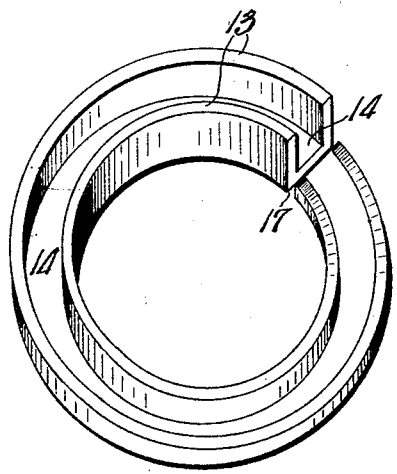
Fig. 4 is a perspective view, on a larger scale, of either one of the expander rings shown in Fig. 1, and showing one inclined contacting surface on each expander ring.

The sealing means shown in Figs. 1, 2, and 4 consists of the expander rings A and B and the spring C.

The expander rings A and B, duplicates in the present instance, are interposed between a pair of packing rings D and E having the usual parallel sides 10 and 11.

The sides 12 of the expander rings A and B are parallel and abut the faces or sides 11 of the packing rings A and B as clearly seen in Fig. 2.

The sides 13 of the expander rings A and B are each formed as an inclined surface complementary and duplicates of each other and contacting each other along their entire circumferential length when these rings are superimposed.

The groove 14 extends all around in the inclined portions of the expander rings, both grooves being complementary and forming a continuous internal passage way substantially all around the expander rings when they are assembled.

Figure 6:
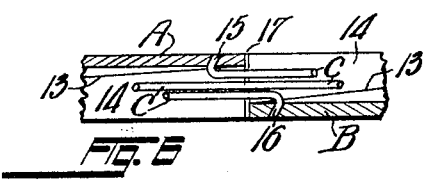
Fig. 6 is a sectional view, showing the relation of the ends of the two expander rings and one manner of securing the ends of the spring to the respective expander ring.

The spring C comprises one complete turn of wire extending all around in the groove 14 and one nearly complete turn having the end 15 hooked into the expander ring A while the end 16 is hooked into the expander ring B as seen in Fig. 6 so that the tension of the spring C tends to rotate one or both of the expander rings oppositely against the inclined surfaces to increase the combined width of the expander rings and thereby force the packing rings laterally upon their seats on the piston.

The tension of the spring C should be just sufficient to rotate the expander rings oppositely as set forth but should not be great enough to wedge the expander rings between the packing rings to prevent the latter from expanding radially.

Each of the expander rings is split. It is preferred that the slits 17 are provided at the juncture of the heaviest and lightest portions of the expander rings and that the slits 18 of the packing rings are disposed away from the slits 17 to mitigate leakage.

It is preferred that the ends 15 and 16 of the spring C are hooked into the expander rings as shown in Fig. 6 where the holes into which these ends hook are inclined to prevent the spring ends from disengaging the expander rings when the piston is vibrated.

Figure 5:
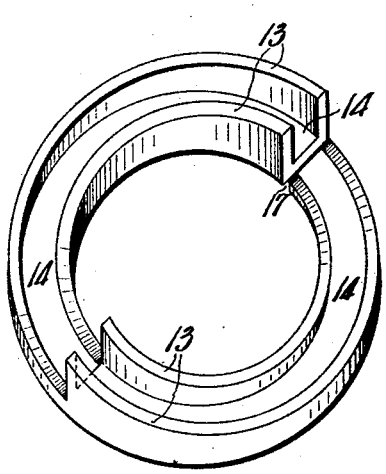
Fig. 5 is a perspective view, similar to Fig. 4, showing two inclined contacting surfaces on each expander ring.

In Fig. 5 I have shown an expander ring having the side 13 formed with two inclined surfaces. This modification provides a steeper angle between the contacting surfaces of the expander rings and permits the use of a stronger spring and mitigates the tendency of the expander rings to wedge too tight.

Figure 3:
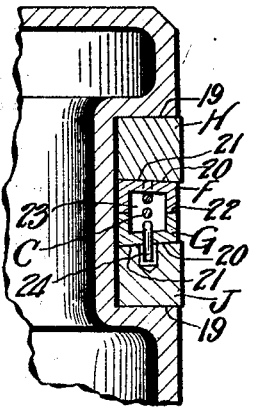
Fig. 3 is a longitudinal section similar to Fig. 2 sectionally showing a pair of packing rings having the inner sides inclined and the structure of the expander parts and the relations thereof to each other and to the packing rings.

In Fig. 3 I have shown a pair of expander rings F and G interposed between a pair of packing rings H and J.

In this instance, the sides 19 of the packing rings are parallel with each other while the sides 20 thereof are inclined radially and the sides 21 of the expander rings correspond to the sides 20 of the packing rings while the sides 22 are inclined longitudinally as seen in either Fig. 4 or 5.

The groove 23 and the spring C are here provided as previously set forth except that the end 24 of the spring C is also hooked into or engages the packing ring J to prevent the rotation of the expander ring G in relation to the packing ring J to prevent wedging of the expander rings between the packing rings.

The structure of the modification shown in Fig. 3, although more expensive than the structure shown in Fig. 2, has the advantage of helping the packing rings in their radial expansion and of mitigating the wedging action of the expander rings due to the double inclined surfaces thereon and due to the fact that one of these inclinations is longitudinal of the expander rings while the other of these inclinations is radial.

Modifications other than those shown and pointed out may be made within the scope of the appended claims; therefore, without limiting myself to the precise construction and arrangement of elements shown and described and pointed out,

I claim:—

1. A ring composed of two laterally adjacent parts having oppositely inclined meeting faces, a coil spring between said parts, the coils of said spring extending circumferentially within said parts, and opposite ends of said spring operatively connected with opposite parts.

2. A ring structure comprising, a pair of sealing rings having oppositely inclined meeting faces and a circumferentially continuous groove common to both of these rings, and spring means in said groove for moving said rings on each other against the inclined faces thereon.

3. A sealing means comprising, at least one packing ring having a lateral seat on one side thereof and the other side thereof inclined, laterally unresilient but laterally expansible means adjacent the inclined side of said packing ring and having a radially inclined side abutting the inclined side of said packing ring, spring means for laterally expanding said expansible means to retain said ring upon the seat thereof, and said spring means confined within the body of said expansible means.

4. As a new article of manufacture, a ring made in two laterally adjacent duplicate parts, the meeting faces of said parts having at least one circumferentially inclined surface, said meeting faces duplicates of each other, said parts provided with a circumferentially continuous recess, said recesses duplicates of each other and complementary to form a circumferentially continuous groove, a coil spring in said groove, one end of said spring operatively connected with one of said parts, and the other end of said spring operatively connected with the other of said parts.

OTTIS R. BRINEY.